March 26, 1957 — I. E. COFFEY — 2,786,423
FUEL PUMP ASSEMBLY
Filed Oct. 29, 1952 — 7 Sheets-Sheet 1

INVENTOR.
IRVEN E. COFFEY
BY
ATTORNEY

March 26, 1957 I. E. COFFEY 2,786,423
FUEL PUMP ASSEMBLY
Filed Oct. 29, 1952 7 Sheets-Sheet 2
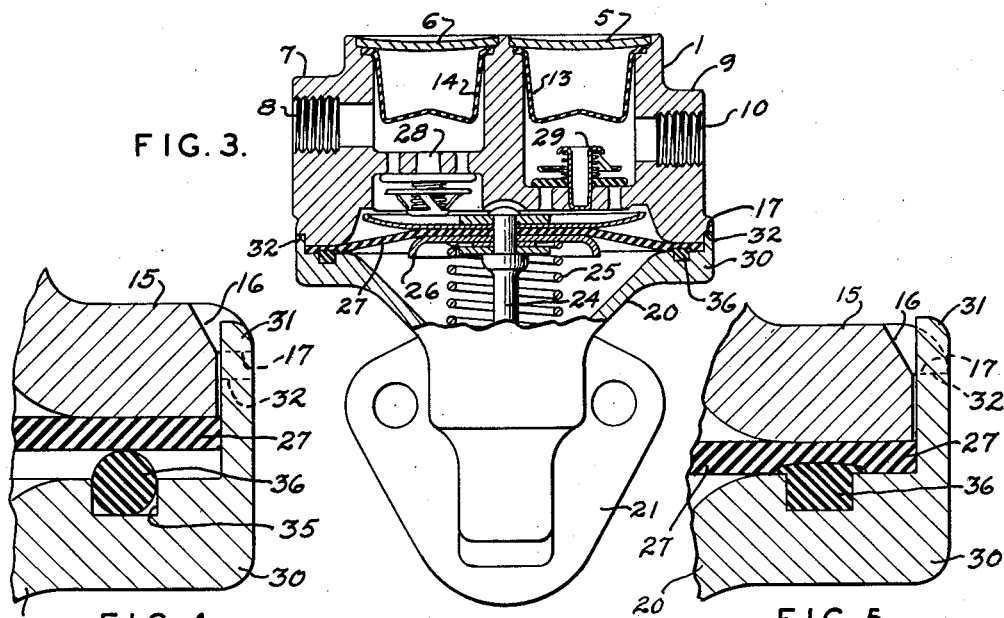
FIG. 3.
FIG. 4.
FIG. 5.
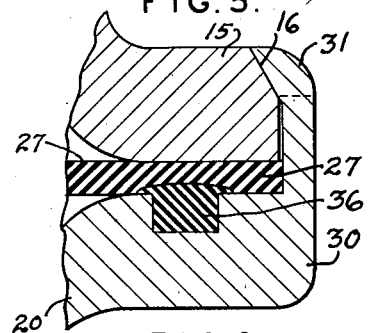
FIG. 6.
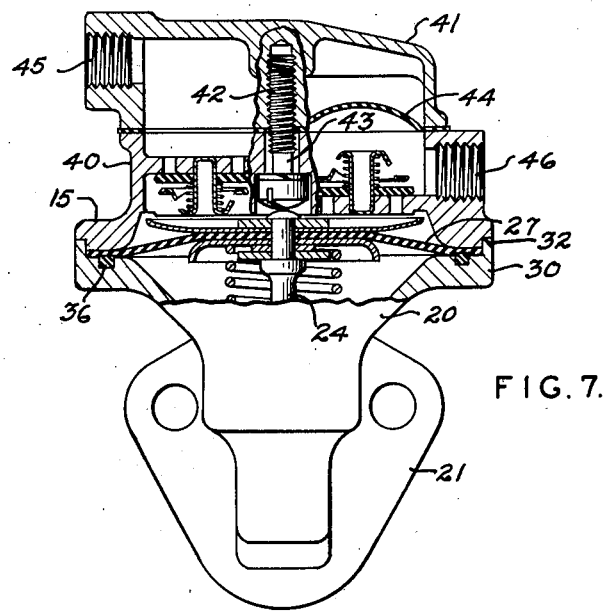
FIG. 7.
INVENTOR.
IRVEN E. COFFEY
BY
ATTORNEY

INVENTOR.
IRVEN E. COFFEY
BY
ATTORNEY

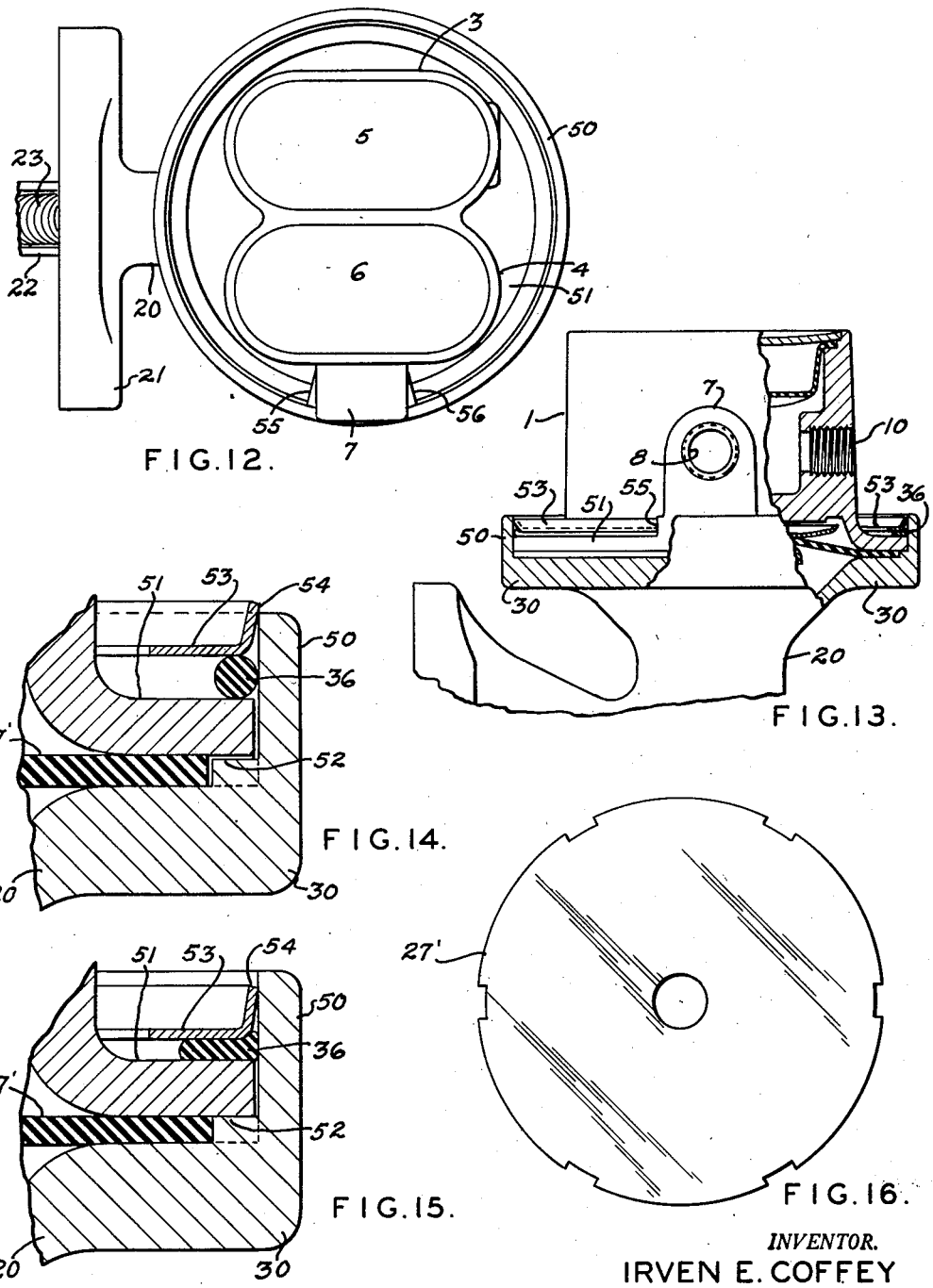

*INVENTOR.*
IRVEN E. COFFEY
BY
ATTORNEY

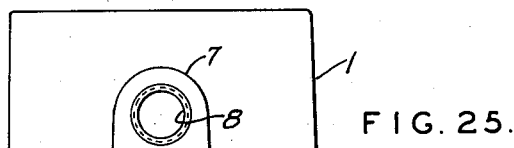
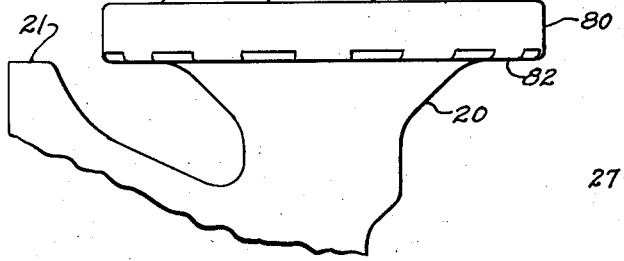
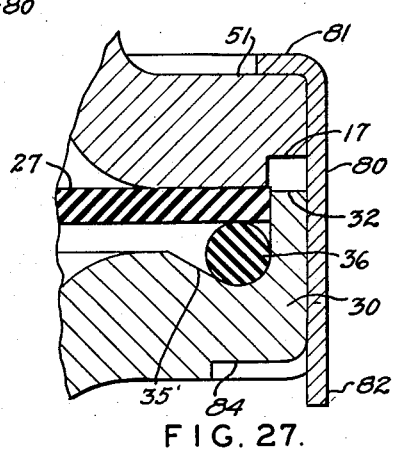
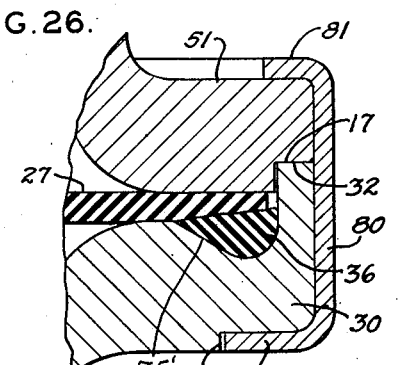
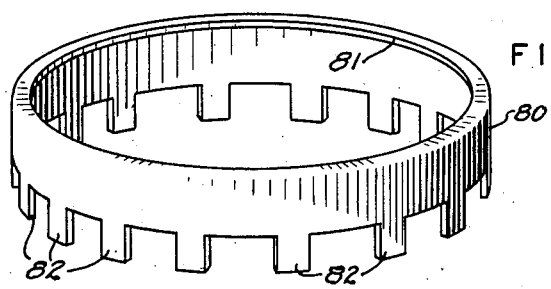

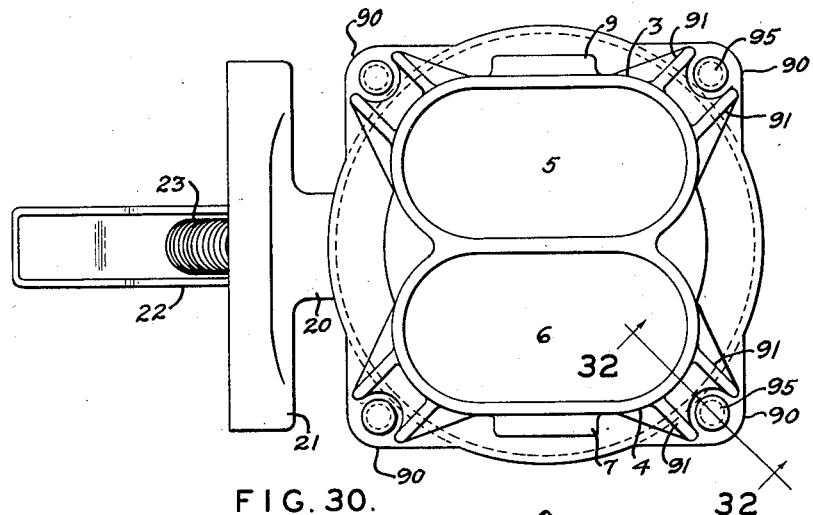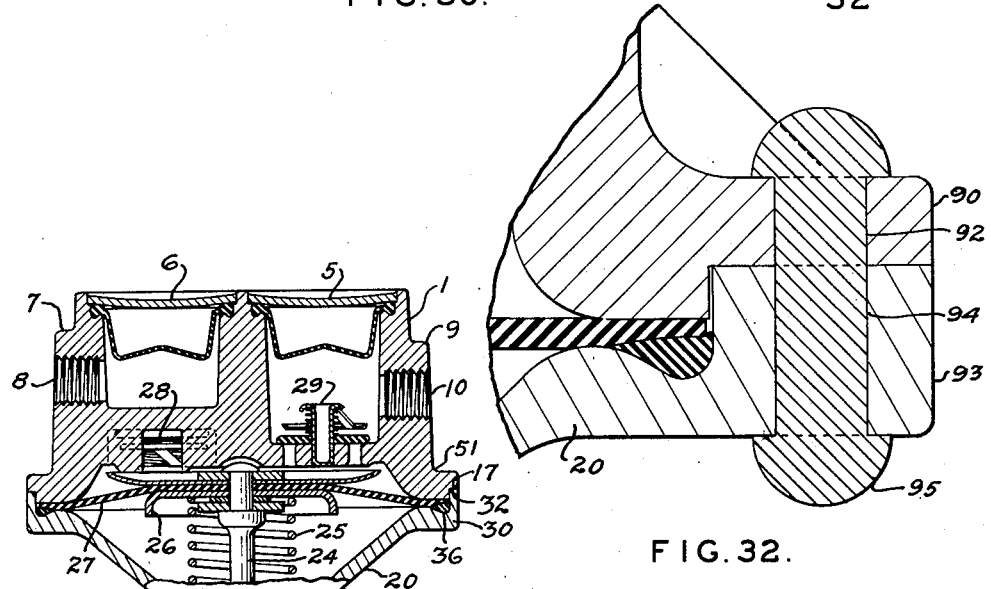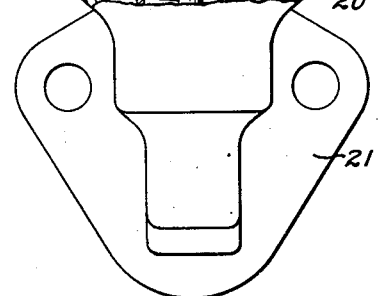

United States Patent Office 2,786,423
Patented Mar. 26, 1957

2,786,423
FUEL PUMP ASSEMBLY

Irven E. Coffey, Clayton, Mo., assignor, by mesne assignments, to ACF Industries, Incorporated, New York, N. Y., a corporation of New Jersey Application October 29, 1952, Serial No. 317,499

14 Claims. (Cl. 103—150)

This invention relates to a casing seal as applied to a diaphragm pump adapted to be powered from a driven cam shaft. Pumps of this type are suitable for many uses, but the particular one described and shown here is a fuel pump constructed to be attached directly to an engine, so that the pump lever is oscillated directly or by intermediate linkages from the engine cam shaft. It is usual to manufacture this type of fuel pump with two or more separate flanged casings, assemble the pump parts in the casings, and finally clamp the casings together by a plurality of circumferentially spaced screws through the flanges. The present invention is a more or less permanent seal between the casing flanges, which wholly eliminates the use of screws through the flanges, and thereby many costly machining and assembly operations. More specifically, the present invention is applicable where it is necessary to clamp the diaphragm of the pump between the casing flanges.

It will be obvious that the elimination of screws in the flanges of the pump casing inherently does away with many machining operations, but there are other unobvious advantages and benefits, all of which contribute to a more uniform comparative performance between the final products. The machining operations mentioned above leave chips which must, in turn, be cleaned away from the casings, and the cleaning operation involves another work operation to which the parts are subjected. In this operation, the parts to be cleaned are tumbled in a washing fluid, and, to do this, it is necessary to load and unload the casings to and from steel baskets. It follows that the washing and handling add to the expense of manufacture. Besides this disadvantage, these operations are rough on the casings, and, of course, no cleaning operation is totally or completely efficient. Some of the parts will necessarily be damaged sufficiently by the rough handling to cause rejection of the completed pumps; others will still contain chips not eliminated by the washing operation. In the latter case, these chips have a tendency to cling to rubber diaphragms, valves, or seats in the completed pump, and thereby decrease the pump efficiency, so that the final products will be non-uniform in comparative output.

Of course, the rejections are a total loss, but defective pumps are to be avoided at all costs. These develop trouble after being put in use, which damages the reputation of the manufacturer.

On one of the modifications herein disclosed, provided with the seal according to this invention, the only machining operation involved is tapping for the threads in the bosses which receive the pipe connections. The less machining done, the less the amount of chips and, it follows, the simpler the cleaning operation.

The improved seal herein disclosed also results in fewer rejects due to defective diaphragms, and improved diaphragm life for other reasons. Aside from the fact that there is no need for screw holes in the diaphragm, which in itself constitutes one source of trouble, other advantages flow directly from the features of this novel seal.

In this seal, the casings are provided with abutments which not only hold the casings together, but also limit the clmaping pressure imposed on the diaphragm by the flanges of the casing. The possibility of uneven tightness due to uneven application of pressure by the clamping screws is thus avoided. The diaphragm is subject to uniform pressure throughout its periphery, and there is no chance of uneven stresses in operation.

The improved seal herein disclosed also results in fewer rejects and improved diaphragm life due to the elimination of difficulties encountered in the assembly of the casings. The assembly operation is usually carried out by inserting and tightening the screws consecutively. Thus the diaphragm is stretched circumferentially. When this happens, the last one or two holes of the diaphragm will fail to register with the holes provided in the flanges, and the forcible insertion of the screw tends to produce slight breaks in the diaphragm which may cause rupture or leaks to develop during pump operation. In any event, assembly of the pump in the above manner causes uneven stresses on the diaphragm which contributes to premature failure.

The improved seal herein disclosed may result in either a smaller pump or one of the same size but with increased capacity. Because holes are not necessary in the diaphragm and the casing flanges, the dimensions of the latter may be decreased, thus providing a more compact pump of smaller outside diameter. On the other hand, if the outside diameter is the same, smaller flanges will provide for a larger active diaphragm area. This advantage should not be overlooked because, on the modern engine, installation space is definitely restricted, and accessibility must be provided.

Other advantages in manufacture and assembly will be mentioned herein as the description proceeds.

It is an object of the present invention to provide a pump with a novel sealing means between the casing parts.

It is a further object of the invention to provide a pump which is simpler in manufacture and assembly.

It is a further object of the invention to provide a seal for a pump which will produce more uniform comparative characteristics between pumps when placed in production.

It is a further object of the invention to provide a pump with a seal between the casing parts to provide uniform pressure circumferentially of a diaphragm clamped between the parts.

It is a further object of the invention to provide a pump with a seal between the casing parts which, during assembly, will automatically provide the proper loop in the pump diaphragm.

Referring to the drawings:

Fig. 3 is a full sectional front view of the assembled pump of Fig. 1.

Figs. 4, 5 and 6 show three views on an enlarged scale of the casing flanges of the pump to illustrate the method of assembling the pump of Fig. 1.

Fig. 7 is a front elevation of a pancake-type pump, partly in section, to illustrate the seal used in the hat-section type of pump applied to this type.

Fig. 12 is a top plan view of the hat-section type of pump provided with a modified form of seal.

Fig. 13 is a side elevation of the pump shown in Fig.

12, partly in section and partly broken away, to illustrate the parts of the seal when assembled.

Figs. 14 and 15 show two views of enlarged flange section of the pump shown in Fig. 12 to illustrate the seal before and after assembly.

Figure 17:
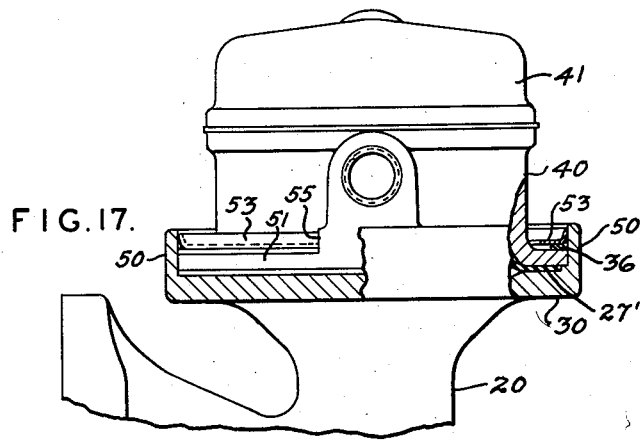

Fig. 16 illustrates a diaphragm such as used in Fig. 12 and in Fig. 17.

Fig. 17 shows a pancake-type of pump with the flanges in section and parts broken away to illustrate the same seal applied to this type of pump.

Figure 18:
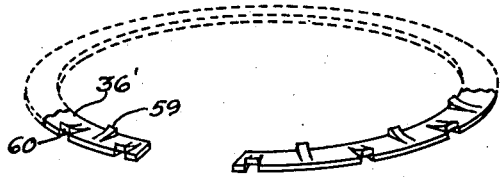

Fig. 18 illustrates a metal spring ring usable in place of the O-ring of Figs. 13 and 17.

Figure 19:
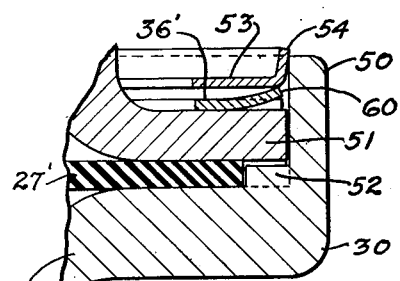

Fig. 19 is an enlarged section of the flanges of the pump casing illustrating the position of the spring ring of Fig. 18 in the assembly of the seal.

Figure 20:
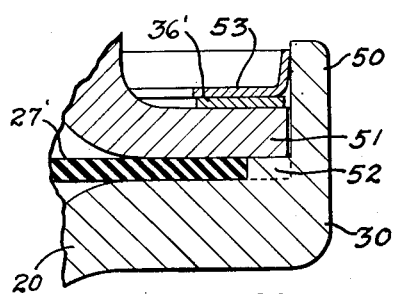

Fig. 20 is a view corresponding to Fig. 19, illustrating the seal assembled.

Figure 21:
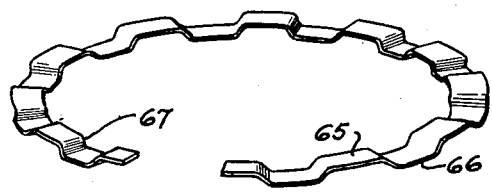
Figure 22:
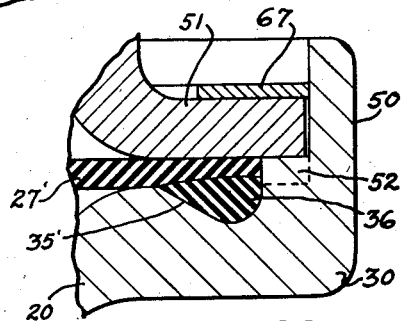

Fig. 21 illustrates a rippled form of locking ring such as used in Fig. 22.

Fig. 22 is an enlarged sectional view of the flanges of the pump in Fig. 17 provided with a modified type of locking ring and seal.

Figure 23:
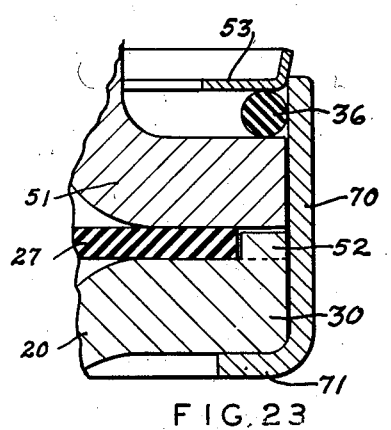
Figure 24:
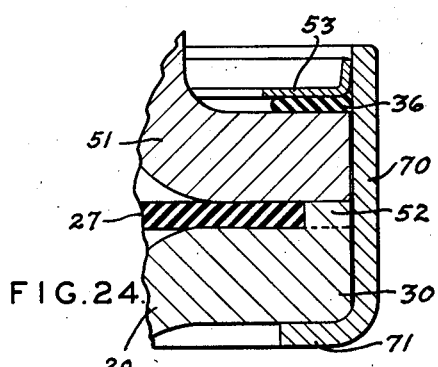

Figs. 23 and 24 are enlarged sections of the pump casing illustrating the same seal as in Fig. 13, using a separable ring.

Fig. 25 shows a hat-section type of pump with a modified form of locking ring.

Fig. 26 is a partial sectional view of the pump shown in Fig. 25.

Fig. 27 is a view in enlarged section showing the flange portions of the pump in Fig. 25 in position for locking the parts together.

Fig. 28 is a view similar to Fig. 27, showing the clamping ring in locked position; and Fig. 29 is a perspective view of the clamping ring used in Fig. 25.

Fig. 30 is a top plan view of a modified form of hat-section type of pump.

Fig. 31 is a front elevation view, in section, of the pump in Fig. 30.

Fig. 32 is a fragmentary section taken along the line 32—32 of Fig. 30.

Several modifications of the invention are shown in the drawings and, to aid in recognizing similar parts, the same reference characters will be used to indicate like parts in the several views.

Figure 1:
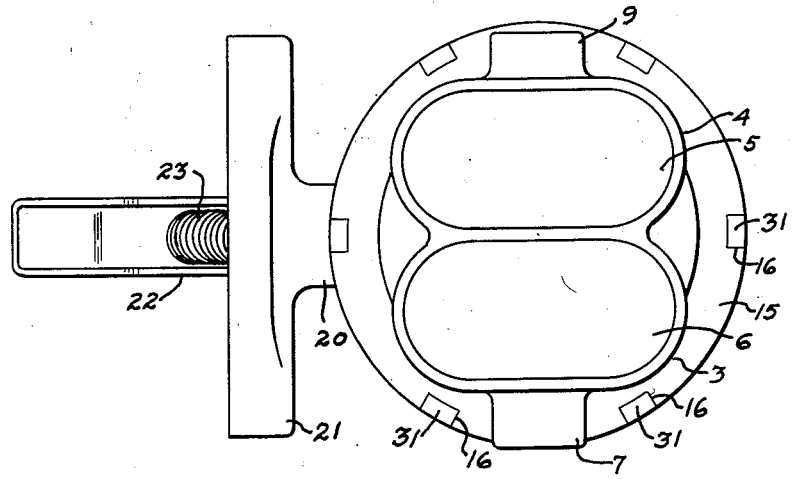
Fig. 1 shows a top plan view of a hat-shaped pump according to the present invention.

In Fig. 1 is shown a hat-section type of pump, so called because of the shape of the diaphragm forming the air dome. This particular feature forms no part of the present invention, but is disclosed and claimed in my copending application, Serial Number 317,498, filed October 29, 1952, for Fuel Pump Dome Structure. The present pump has an upper casing with a body portion 1 which is a metal die casting usually of aluminum alloy, or the like. In the body portion are two vertically extending hollow chambers 3 and 4 provided with integral bosses 7 and 9, respectively. A flange 15 is provided on the body 1.

Figure 2:
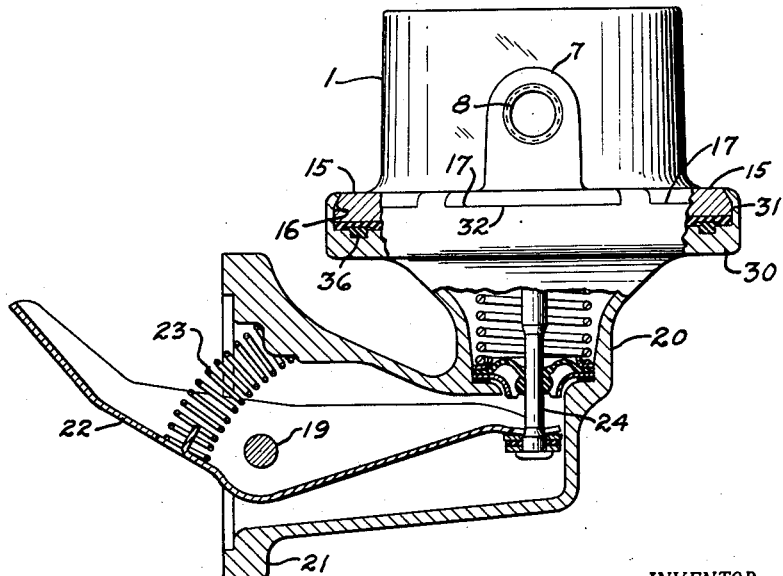
Fig. 2 is a full side elevational view of the pump of Fig. 1, partly in section and partly broken away, to show the actuating lever and the seal between the flanges of the casings.

Turning now to Figs. 2 and 3, the bosses 7 and 9 are provided with threaded passages 8 and 10 for the inlet and outlet of the pump, respectively. Each of the chambers 3 and 4 is further constructed with valve seats for valve assemblies 28 and 29, respectively, which are disclosed and claimed in my prior application for Check Valve Device, Serial No. 238,130, filed July 23, 1951. The upper end of each chamber seats a hat-shaped diaphragm 13 and 14, respectively, secured in place by the expansion plugs 5 and 6.

The lower casing 20 for the pump is generally referred to as a lever casing, and mounts the oscillating lever 22 on a pivot pin 19 within the flange 21. This flange is provided with bolt holes, or the like, for attachment to the engine, and lever 22 is thus positioned for actuation by the cam shaft of the engine in one direction, and by spring 23 between the lever casing and the lever in the opposite direction. Lever 22 connects with stem 24 for directly actuating the diaphragm 27 of the pump through its connection therewith 26. Surrounding the stem 24 is compression spring 25 for securing the usual oil seals, or the like, in the casing 20 which surround the stem 24, and for biasing the stem 24 upwardly.

The present invention is a novel seal for the joint between flanges 15 and 30 of the upper casing and the lever casing. It will be noted that both flanges have the same outside diameter. The upper flange 15 is provided with a plurality of spaced notches 16 which are inclined toward the upper flange surface. Between these notches and spaced thereby are arcuately extending shoulders 17.

The lever casing, in turn, has a flange 30 with a ring of circumferentially spaced upstanding tines or fingers 31 for reception in the notches 16 of the upper flange 15. Between the fingers, the flange 30 has upwardly facing arcuate shoulders 32 abutting corresponding shoulders 17 on the upper flange 15. The upper radial face of the lever casing 20 is provided with an annular groove 35, in which is placed an O-ring 36. Diaphragm 27 is positioned between the lower radial face of the flange 15 and the upper radial face of the flange 30, and rests upon the upper surface of the O-ring 36.

In assembled relation, the parts, including the shoulders, fingers, and spaced notches, are interengaged, with the fingers 31 deformed inwardly into the notches 16, and shoulders 17 and 32 tightly locked together. The shoulders position the flanges 15 and 30 in spaced relation, and thereby limit the amount of pressure imposed by the flanges 15 and 30 on the diaphragm and O-ring. Even so, it will be noted that the O-ring is deformed to fill the ring groove. The O-ring is of a material carefully chosen for its inherent characteristics of recovery to its original size and shape, so that the seal will remain effective and the casing flanges tightly engaged during the life of the pump, regardless of expansion and contraction of the metal.

The steps in assembling the seal are illustrated in Figs. 4, 5 and 6. The O-ring 36, diaphragm 27, and flange 15 are arranged in superposed position with respect to the flange 30, as shown in Fig. 4.

Pressure is then applied to squeeze the upper and lower flanges together until the shoulders 17 engage or abut shoulders 32, and thereby limit further movement of the flanges to increase the pressure on the diaphragm and O-ring.

The thickness of the diaphragm used will determine the proper location of the shoulders 17 and 32 on the flanges 15 and 30, respectively, since location of the shoulders on the flanges determines the minimum spacing between the flanges.

The last step in the method is to deform the tines 31 into engagement with the bottom of notches 16, as in Fig. 6. The final product is a seal which is permanent for the life of the pump, and also tamper-proof, since, to disengage the tines 31 from the notches 16 would probably cause fracture. The flanges, when sealed in this manner, are smooth and even, so that the two casings in appearance resemble a single casing. Even the parting lines of the joint between the two casings are difficult to detect.

The steps in the method of assembly of the two casings can be performed mechanically by a press which first engages the casings and resiliently urges them together until shoulders 17 and 32 abut. The same press may be provided with an inwardly beveled face concentric with the tines 31, which will subsequently engage the tines during the press operation, compressing the tines 31 endwise and forcibly bending the same into the notches 16 to couple the two casings.

Fig. 7 illustrates the same type of seal applied to the pancake-type of fuel pump. This type of pump is identical mechanically with the previous type described, except as to the construction of the upper casing, which, in this instance, is in two sections 40 and 41, the latter of which forms a cap or closure. Between the sections is a combined diaphragm and gasket 44 and two attaching screws 43 (one shown) engaged with threads 42 in the upper closure 41. Two threaded pipe connections provide an inlet at 45 in the cap section and an outlet at 46 in the upper casing section. Since access to the screws 43 can be had only during assembly, this type of pump also becomes a sealed tamper-proof unit after assembly of the seal between the flanges 15 and 30.

Figure 8:
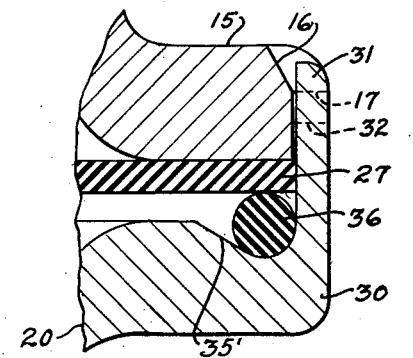
Figs. 8, 9, 10 and 11 show in enlarged section two modified forms of seal before and after assembly.

Fig. 8 shows a modified form of the seal between the flanges 30 and 15, which is adaptable to any of the types of pump described. In this modification, the flange 15 is likewise provided with the inclined notches 16 and the arcuate downwardly facing shoulders 17. The lower flange is provided with the upstanding fingers 31 and upwardly facing arcuate shoulders 32. Instead of the ring groove 35 previously described, in this modification the groove for the O-ring 35' is of arcuate section tangent with the inner face of a ring having the fingers 31 and shoulders 32, and provided with a beveled surface extending inwardly of the radial face of the flange 30.

Figure 9:
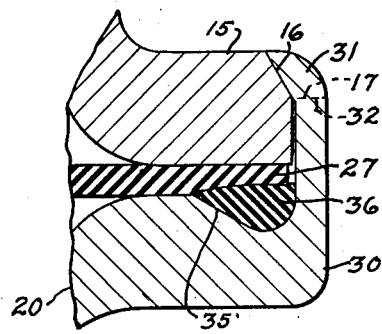

Fig. 9 shows the parts in sealed relation, and it will be noted that, during the compression of the O-ring 36, it expands inwardly of the radial face of the flange 30, thus carrying with it the diaphragm 27. Because of this unusual action during compression of the O-ring 36, it is unnecessary to assemble the pump in a jig in order to form the loop in the pump diaphragm 27.

Figure 10:
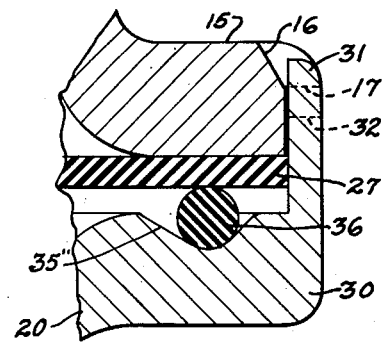
Figure 11:
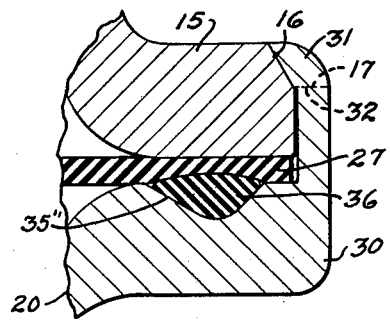

In Fig. 10 is shown a modified form for the same seal as above described. Similar parts carry similar reference characters. In this particular form, the groove 35" in the upper radial face of the flange 30 comprises a small arcuate section, a steep beveled section tangent thereto and extending outwardly of the flange 30, and a more gradual beveled section extending inwardly of the radial face of the flange 30. As shown in Fig. 11, when the flanges 15 and 30 are brought into sealed relation, the O-ring is compressed and is distorted inwardly of the radial face of the flange 30 to a greater degree than outwardly. This is for the obvious reason that greater room for expansion is provided inwardly of the flange 30. The outer beveled portion of the groove 35" is primarily for the purpose of eliminating sharp edges. In this form, like that in Fig. 9, compression of the O-ring will automatically provide a loop in the diaphragm 37.

In Fig. 12 is shown a hat-section type of pump with a modified form of seal. This pump structure is the same as that already described, and it differs only in the flange construction to accommodate the seal. The upper casing has a body 1 and hollow chambers 3 and 4, the former of which has an outlet boss internally thereof threaded at 10 to receive a pipe connection, as in Fig. 13. Chamber 6, as shown in the same figure, has an external boss with a threaded inlet pipe connection 8. In addition, this boss has radial faces 55 and 56 adjacent the lower casing flange 51.

Casing 20 has flange 30 with an upstanding ring or collar 50 and internal spaced shoulders 52 (Fig. 14) on its upper radial face which are slightly less in height than the thickness of the unstressed diaphragm 27'. A split clamping ring 53 abuts faces 55 and 56 and frictionally engages the interior surface of the ring or collar 50 to clamp the casings together. A spring ring which may be in the form of a split O-ring is used under the split clamping ring 53 to resiliently maintain the parts in sealed relation.

Fig. 14 illustrates the method of assembly of this modified form of seal. Diaphragm 27', having a notched periphery as shown in Fig. 16, is placed upon the upper radial face of flange 30 with the notches in registry with shoulders 52. Upper casing 1 is then placed in position with flange 51 on the diaphragm. A split O-ring or spring ring overlies flange 51, and the unit is locked together by split locking ring 53 superimposed on the resilient spring ring. Both the spring ring and locking ring have ends abutting faces 55 and 56. The locking ring 53 has an upturned outer rim 54 of slightly greater diameter than the internal diameter of ring or collar 50.

The casings are then forced together in a press until lower radial face of flange 51 contacts the upper surface of shoulders 52, thus definitely limiting and uniformly applying the compressive forces upon the diaphragm 27'. This operation may be performed by a spring pressed plunger, or the like, and further action of the press telescopes the clamping ring 53 with ring or collar 50 and wedges it within the ring or collar 50 by compressing the resilient rim 54 of the ring to lock the parts clamped tightly together as shown in Fig. 15. The pressure of the locking ring deforms the resilient ring, but the ring is of material possessing the characteristics for permanent recovery, which maintains the parts resiliently tensioned at all times.

Fig. 17 shows a pancake-type of pump with exactly the same seal as above described for the hat-shaped pump of Fig. 12. Similar reference characters are used to identify like parts. Flange 30 and collar 50 are integral with the casing 20, and upper casing 40 has a flange 51 held in locked, sealed relation with lower casing flange 30 by a split resilient O-ring 36 and split clamping ring 53 identical with those above described and assembled in the same manner to form a coupling.

In describing the seals for the pumps shown in Figs. 12 and 17, a resilient O-ring 36 has been described, but it is contemplated that a resilient ring of metal or the like may also be used in place of the O-ring. In Fig. 18 such a ring has been shown. The metal ring 36' of Fig. 18 is constructed of spring steel, and at each periphery of the ring are spring fingers 59 and 60, which may be flattened by sealing ring pressure but which will inherently maintain their tendency to restore themselves to the position of Fig. 18, whereby the seal is tensioned by the ring. An example of the use of this ring of Fig. 18 is shown in Figs. 19 and 20. In these views a section of the flange portions of the pump are shown, and the pump may be of any particular type as in the above views. In Fig. 19 a diaphragm 27' is placed in position on the upper radial face of the flange 30 with notches in registry with the shoulders 52. The flange 51 of the upper casing is disposed on top of the diaphragm. Upper face of flange 51 receives the spring ring 36', and above the spring ring is clamping ring 53. In this view the fingers 59 and 60 are undeformed, but when the clamping ring is pressed tightly down to seal the joint between the pump casings as in Fig. 20, it will be noted that the resilient ring is flattened out. Since the fingers 59 and 60 retain their resilient nature, they tend to restore to their original shape as shown in Fig. 18, thereby holding the flanges of the pump casings tensioned beneath the clamping ring 53.

It is also contemplated that the spring ring and clamping ring may, in effect, be combined in one element. Such a device is shown in Fig. 21, and its use illustrated in the combination in Fig. 22. The spring locking or clamping ring 67 of Fig. 21 is formed of mild steel and provided with offset flat faces 65 and 66. To use this spring clamping ring for the purpose intended, a seal of the combined type is shown in Fig. 22. In this form, the lower casing has the usual flange 30 and upstanding ring or collar 50, and the upper casing the usual flange 51, which contacts the shoulders 52 to limit the compression of the upper flange on the diaphragm 27'. A ring groove is provided in the upper radial face of the flange 30, indicated as 35', the same in contour as that shown in Fig. 10. Locking ring 67 contacts the upper face of flange 51, and the flanges are forced into abutting relation as explained. In the pressing operation, the ring 67 is deformed into a flattened condition, or near flattened condition, which expands the circumference of the ring, thus engaging its outer edge firmly with the interior surface of ring or collar 50. At the same time the ring retains some of its springy nature and will effectively tension the parts in locked relation.

Fig. 23 shows a modified type of seal employing a separate locking ring flange. In this view, lower flange 30 is of the same diameter externally as the upper flange 51, but ring or collar 50 is replaced by a ring 70 having a lower flange 71 abutting the under surface of flange 30 of lower casing 20. Otherwise the structure is exactly the same as that shown in Fig. 14.

Fig. 24 shows the parts locked in clamping engagement whereby the joint between the upper and lower pump casings is sealed. This modification possesses separate advantages from the permanent seals above described, since it is possible to form the ring 70 with a frangible portion, so that the ring may be easily ruptured and removed, thereby giving access to the pump interior for repair or replacement of diaphragm or valves. Rings of a character indicating the origin of the pump, and having a distinctive color, might be used in the first instance to indicate a new pump, so that, if the ring is removed or replaced, that fact would become known to the purchaser, since only rings having the identifying trademarks or color, or the like, would be used by the manufacturer for new equipment. Different colored replacement rings could be supplied to the authorized dealers by the manufacturer for use on reconditioned pumps, so that misrepresentation of the product would not be possible. Any other ring would indicate that the pump had been repaired or tampered with by someone other than the manufacturer or the manufacturer's agent.

In Fig. 25 is shown a hat-section type of pump in which the casings are coupled by a separate locking ring similar to that shown in Fig. 24, but differing in specific detail from the previous type of locking ring. The same reference characters indicate corresponding parts of the pump as in the previous illustrations.

Referring to Fig. 25, the pump body 1 has a flange 51 with a downwardly-facing shoulder 17, much as in the modification shown in Fig. 3. Here the shoulder 17 is continuous throughout the periphery of the flange 51 and of proper diameter to meet with and abut the upper face of shoulder 32 of collar 30 on the lever casing 20. The faces are arranged to abut and thereby limit the pressure placed on the diaphragm 27 and deformable O-ring 36.

Fig. 27 shows the parts assembled before sealing. Flange 30 is provided with a ring groove 35' of the same type as shown in Figs. 8 and 9, and receives the O-ring 36. Superposed on the O-ring is the diaphragm 27 supporting flange 51. An inverted, cup-shaped locking or clamping ring 80, as shown in detail in Fig. 29, has a flange 81 which overlies the pump body flange 51 and downwardly extending deformable tines or fingers 82 which are adapted to be received in notches 84 in flange 30. The material used in this locking ring, and likewise in all the others, may be metal or plastic, as desired. It is contemplated also that the material used be one which will fracture if force is applied to remove the ring or to unlock the parts of the ring from engagement with the casing flanges. The locking rings are thereby non-reusable.

Fig. 28 shows flanges 51 and 30 coupled together by the locking ring 80. Shoulders 17 and 32 are first pressed into contact, thus distorting the O-ring in groove 35' and sealing the diaphragm and joint between the casings. Tines 82 are then deformed within the notches 84 for securing the casings. It is a feature of this type of seal that, when compressed, it automatically provides the loop in the diaphragm 27, which is necessary to accommodate the reciprocating motion of the stem 24. The action of the O-ring, when distorted and compressed, produces an action as shown in Fig. 28 to compress the diaphragm not only radially, but circumferentially. However, during compression the unit pressure exerted on the diaphragm 27 does not increase proportionately. Only the area of contact between the two increases. Thus the increase in pressure caused by squeezing the casings together cannot harm the diaphragm. Likewise, if the pressure between the casings is relaxed due to expansion, the pressure on the diaphragm remains practically constant and the area of contact decreases.

Any separation of the casings or loosening of the seal due to heat or vibration will not destroy its effectiveness, because the O-ring 36 is of a material which possesses a high degree of recovery, which characteristic will maintain the seal and the clamping ring tight.

As explained above for Fig. 24, the ring 80 may bear a distinctive mark or color, or both, to indicate the origin of the pump.

In Figs. 30–32 is illustrated a modification of the pump shown in Figs. 25 and 26. The same reference characters have been used to indicate like parts.

In this modification, sealing ring 80 has been omitted. In its place the casings are permanently secured by rivets. Pump casing flange 51 has four ears 90 formed integrally as shown in Figs. 30 and 32. Ribs 91 extend from the body 1 to the ears 90 on each side of the rivet holes 92 of each ear.

The lever casing 20 has corresponding ears 93 and rivet holes 94 in registry with the abovementioned holes 92. After the casings are pressed together as above explained, rivets 95 are inserted in holes 94 and are headed over to permanently secure the casings together.

Applicant has described herein a plurality of pumps and seals which will fulfill all the objects of the invention above stated. It is contemplated that other combinations of the elements of the seal, or their equivalents, are possible, and the combinations described should be regarded as merely illustrative.

I claim:

1. In a fuel pump, a pair of pump casings, opposed, registering flanged faces on said casings, a pump diaphragm between said faces, abutments on said casings for spacing said faces and thereby limiting the clamping force on said diaphragm, and means for coupling said casings including a ring on one of said flanges and deformable means on said ring engaging the other said flange for maintaining said faces in clamping relation to said diaphragm.

2. In a fuel pump, a pair of separate casings for said pump, said separate casings having engaging limiting abutments opposed, registering faces formed on said casings, a plastic pump diaphragm between said faces, and pressure deformable means protruding from one of said faces engaging said diaphragm and acted upon by pressure between said faces applied in assembling said casings for compressing and deforming said diaphragm circumferentially.

3. In a fuel pump, a pair of separate casings for said pump, said separate casings having engaging limiting abutments opposed, registering faces formed on said casings, a plastic pump diaphragm between said faces, and pressure deformable means protruding from one of said faces engaging said diaphragm and acted upon by pressure between said faces applied in assembling said casings for compressing said diaphragm circumferentially and radially.

4. In a fuel pump, a pair of separate casings, a joint between said casings, a pump diaphragm in said joint, spacing means for said casings, a tamper-proof seal for said joint comprising a ring, interlocking parts between said ring and said casing, and a pressure deformable means in said seal, compressed during assembly of said casings, for maintaining a substantially constant sealing pressure on said diaphragm.

5. In a fuel pump, separate pump casings for said pump, said casings having engaging limiting abutments, flanges on said casings, opposed, registering faces on said flanges, a pump diaphragm between said faces, an annular groove in one of said faces having an inner beveled edge, a pressure deformable means in said groove engaging said diaphragm and acted upon by pressure between said faces in assembling said casings for compressing said diaphragm radially, and means for coupling said casings while assembled.

6. In a fuel pump, a pair of separate pump casings, a pump diaphragm between said casings, and means interconnecting the said casings to form a sealed unit comprising abutment means for positioning said casings and limiting the sealing pressure on said diaphragm, locking means to hold said casings positioned, and pressure deformable means for maintaining a substantially constant sealing pressure between said casings when locked together by said means.

7. In a fuel pump, a pair of separate pump casings, a plastic pump diaphragm between said casings, and means interconnecting the said casings to form a sealed unit comprising abutment means for positioning said casings in spaced relation to limit the pressure on said diaphragm, and a seal comprising locking means to hold said casings positioned, and including a pressure deformable means in said seal, compressed during operation of said locking means, for maintaining substantially constant pressure on said diaphragm.

8. In a fuel pump, a pump body casing and a lever casing, flanges on said casings, opposed, registering faces on said flanges to form a joint between said casings, a pump diaphragm between said faces, a seal for said joint comprising an annular groove in one of said faces, a deformable ring differing in section from said groove and compressed by sealing pressure between said faces to fill said groove and expand radially in contact with said diaphragm for maintaining substantially constant sealing pressure on said diaphragm as said joint expands after assembly, or contracts due to pressure acting on said ring in assembling said casings, and means for coupling said casings while assembled, including a ring on one of said flanges and surrounding the other said flange and deformable parts between said other flange and said ring.

9. The combination as defined in claim 8, wherein said deformable parts are integral with said ring.

10. The combination as defined in claim 8, wherein a separate ring has said deformable parts.

11. In a fuel pump, the combination of separate pump casings, flanges on said casings, opposed registering faces on said flanges, and means for coupling said casings, when assembled, comprising a ring on one of said flanges, spaced recesses in the other of said flanges, deformable portions on said ring engaging in said recesses and anchoring said pump casings in assembled relation, and an O-ring between said casings, compressed during assembly, for maintaining said deformable portions tightly in said recesses.

12. In a fuel pump, a pair of separate flanged casings, a joint between said casing flanges, and a non-reusable, frangible seal for said joint comprising a ring on one of said flanges and a seating portion formed on the other flange, said ring bearing identifiable markings, means on said ring forcibly deformed into permanent clamping engagement with the seating portion of the other of said flanges to secure said casings in assembled relation whereby disassembly of said pump casings requires fracture of said seal by destruction of at least a part of said identifiable ring.

13. In a fuel pump, a pair of separate flanged casings, one of said flanges being formed with a seating portion, a joint between the casing flanges and a non-reusable, frangible seal for said joint comprising a ring bearing identifiable markings with parts thereof forced into permanent clamping engagement with said seating portion to secure said casings in assembled relation whereby disassembly of said pump casings requires the fracture of said seal by destruction of at least a part of said identifiable ring.

14. In a fuel pump, a pair of separate casings, a pump diaphragm between said casings, and means for interconnecting said casings to form a sealed, tamper-proof unit, said means comprising a sealing ring on one of said casings, deformable tines projecting from said ring toward the other of said casings, and means forming a plurality of notches in said other casing into which said tines fully project, when deformed, to hold said casings assembled, said tines filling said recesses flush with the surface of said casing, to conceal the edges thereof and prevent access thereto.

References Cited in the file of this patent

UNITED STATES PATENTS

| | | |
|---|---|---|
| 966,513 | Avery | Aug. 9, 1910 |
| 1,191,061 | Carter | July 11, 1916 |
| 1,367,427 | Pierce | Feb. 1, 1921 |
| 1,888,322 | Lanclot et al. | Nov. 22, 1932 |
| 1,897,876 | Wheeler | Feb. 14, 1933 |
| 1,907,397 | Kosik | May 2, 1933 |
| 1,985,282 | Carter | Dec. 25, 1934 |
| 2,567,683 | Tamminga | Sept. 11, 1951 |
| 2,638,849 | Budlane | May 19, 1953 |
| 2,659,310 | Ryba | Nov. 17, 1953 |